United States Patent [19]

Hochberg et al.

[11] 4,019,188

[45] Apr. 19, 1977

[54] MICROMIST JET PRINTER

[75] Inventors: Frederick Hochberg, Yorktown Heights; William B. Pennebaker, Carmel; Keith S. Pennington, Somers, all of N.Y.

[73] Assignee: International Business Machines Corporation, Armonk, N.Y.

[22] Filed: May 12, 1975

[21] Appl. No.: 576,407

[52] U.S. Cl. .............................................. 346/75

[51] Int. Cl.² ....................................... G01D 15/18

[58] Field of Search .............................. 346/75, 140

[56] References Cited

UNITED STATES PATENTS

| | | | |
|---|---|---|---|
| 2,573,143 | 10/1951 | Jacob | 346/75 |
| 2,577,894 | 12/1951 | Jacob | 346/75 |
| 3,373,438 | 3/1968 | Hochberg | 346/75 |
| 3,673,601 | 6/1972 | Hertz | 346/75 |
| 3,717,875 | 2/1973 | Arciprete et al. | 346/75 X |

OTHER PUBLICATIONS

*IBM Technical Disclosure Bulletin*, vol. 15, No. 8 Jan. 1973, pp. 2389–2391.

*Primary Examiner*—George H. Miller, Jr.
*Attorney, Agent, or Firm*—Philip Young

[57] ABSTRACT

A micromist printing arrangement wherein a micromist of ink particles, provided by an ultrasonic nebulizer, is forced through a small nozzle to form an aerosol jet. The micromist ink particles are entrained in the jet and focused to print a narrow width region which is substantially smaller in size than the overall jet diameter and the nozzle opening. Particle size, jet stream velocity and air or other carrier gas viscosity are considered in establishing focusing characteristics of the aerosol jet, which is directed against the paper to wet the same, thereby obtaining dense, well defined print lines. According to a first embodiment, modulation of the aerosol jet is achieved by fluid logic control whereby a vacuum is introduced into the path of the aerosol jet to shunt it from its printing path. In another embodiment, control may be achieved through the use of sonic excitation of turbulence into the aerosol jet. The sonic excitation changes the aerosol jet from laminar flow to turbulent flow, resulting in a reduction of the velocity of the aerosol jet such that the aerosol ink particles do not wet the paper.

3 Claims, 7 Drawing Figures

FIG. 2
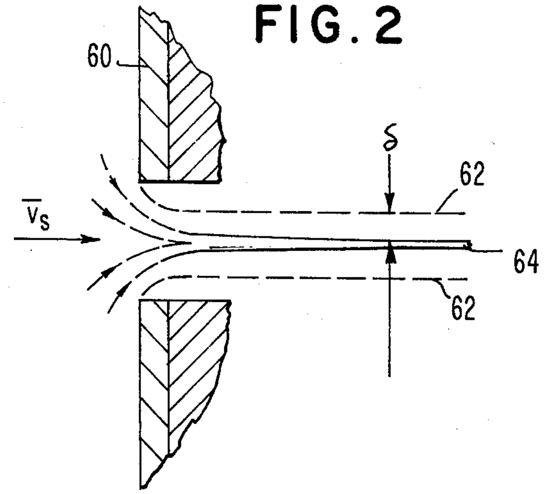
FIG. 3
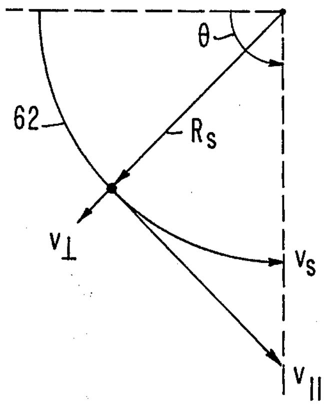
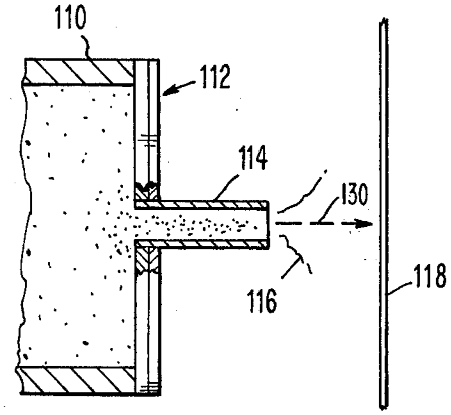
FIG. 4
FIG. 5
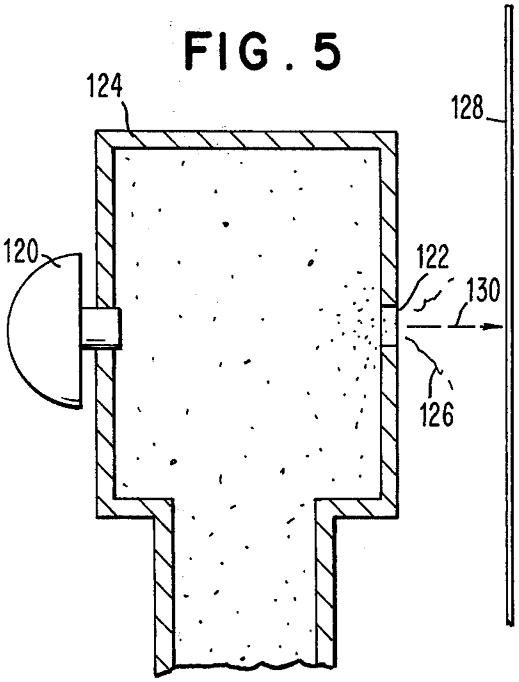

FIG. 6
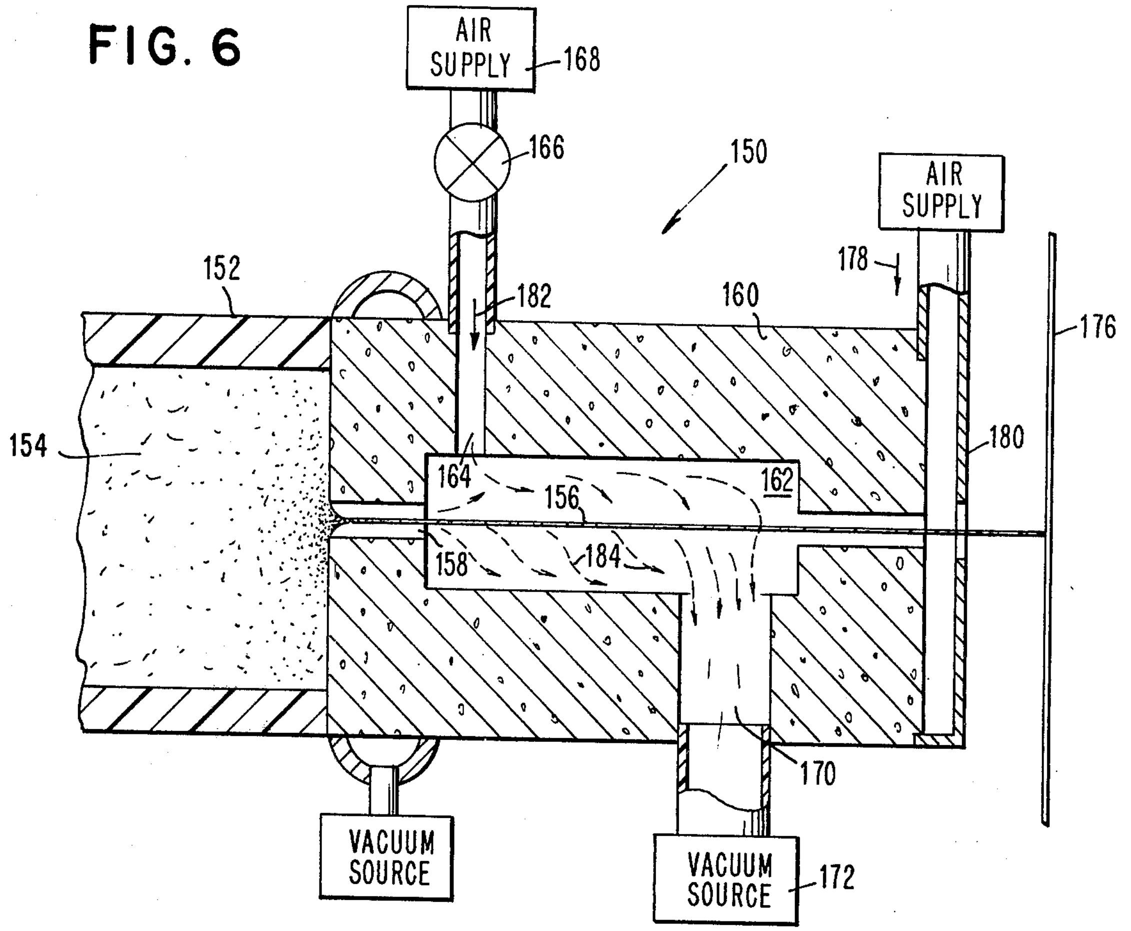
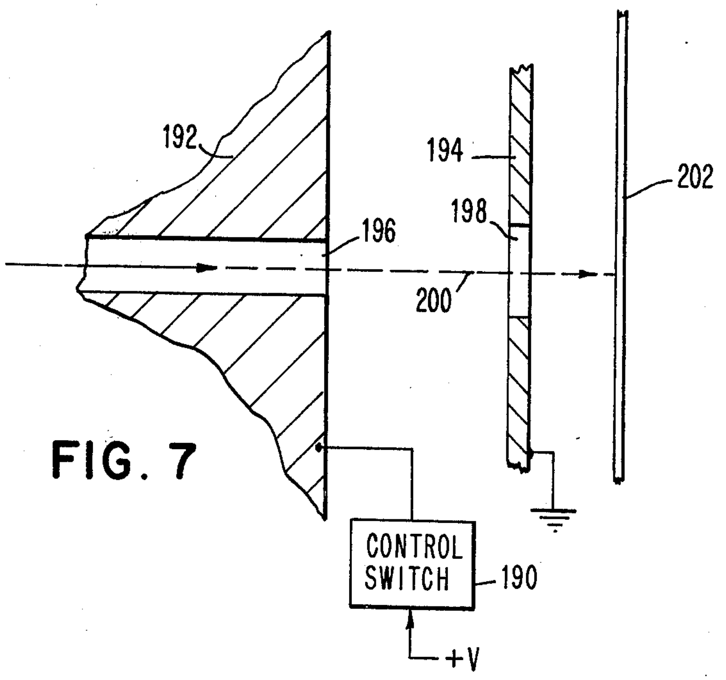
FIG. 7

MICROMIST JET PRINTER

BACKGROUND OF THE INVENTION

1. Field of the Invention

The present invention relates to printing by means of an aerosol or mist of particles, and more particularly to printing with jets of aerosol ink particles.

2. DESCRIPTION OF THE PRIOR ART

Various techniques exist in the prior art for controlling the application of deposition of a cloud or mist of fine particles to a desired surface. Typically, such applications are used for printing, copying, coating, plating, reproducing, and the like. Generally, these techniques involve some form of electrostatic control wherein the particles of the cloud or mist are charged, and the passage of the charged particles to the desired surface is controlled, for example, by selective field deflection or precipitation of the particles out of the path to the intended surface. In other arrangements, selective application or deposition of particles is effected by electrostatic control of apertures leading to the intended surface by blocking or nonblocking fields thereacross.

According to one technique disclosed in U.S. Pat. Nos. 2,573,143 and 2,577,894 issued to C. W. Jacob, ink is atomized and carried as a mist in an air stream which passes a corona electrode where the ink particles are charged. The charged ink particles are then passed through a duct in a precipitating unit where an electrical field causes the charged particles to be precipitated on one side of the passageway. The number of particles deflected from the stream depends on the magnitude of the electrical field signal, thereby controlling the amount of ink deposited on the recording medium located opposite the orifice of the duct.

SUMMARY OF THE INVENTION

It is an object of the present invention to provide a micromist jet printer which prints very fine, dense lines on a printing medium, without the application of magnetic or electrical fields at or adjacent the printing medium to achieve selective or controlled wetting of the ink particles to the printing medium. It is another object to provide a micromist jet printer which prints very fine, dense lines while being relatively free of ink clogging problems in the nozzle area. It is a further object to provide a micromist jet printer having effective means for modulating or controlling the jet.

These, and other objects, are achieved by the present invention which provides a micromist jet printing device wherein a micromist of ink particles, provided by an ultrasonic nebulizer, is forced through a small nozzle to form an aerosol jet. The ultrasonic nebulizer produces micron-size (preferably about 2–10 microns) ink particles in an aerosol. The velocity of the aerosol jet is generally inversely related to the ink particle size such that the ink particles are entrained in the jet and focused to print a narrow width region which is substantially smaller in size than the overall jet diameter and the nozzle opening. Particle size, jet stream velocity and air or other carrier gas viscosity are considered in establishing focusing characteristics of the aerosol jet, which is directed against the paper with the appropriate inertial forces as to wet the same, thereby obtaining dense, well defined print lines. According to a first embodiment, modulation or control of the aerosol jet is achieved by fluid logic control whereby a vacuum is introduced into the path of the aerosol jet to shunt it from its printing path. In another embodiment, turbulence control may be achieved by sonic excitation of turbulence into the aerosol jet. The sonic excitation changes the aerosol jet from laminar flow to turbulent flow of the particles. The turbulence causes mixing with the surrounding air and results in a reduction of both the velocity and the focusing by the jet of the aerosol particles such that the aerosol ink particles do not wet the paper.

BRIEF DESCRIPTION OF THE DRAWINGS

FIG. 2 shows the stream line curvature and ink particle trajectory at the nozzle orifice to illustrate the line narrowing effects provided by the subject jet printer;

FIG. 3 shows the velocity vector for an ink particle, used to determine the deflection of the particle away from the stream line;

FIG. 4 shows an embodiment of the aerosol jet printer employing one form of sonic means for turbulence control of the jet stream;

FIG. 5 shows another embodiment of the aerosol jet printer employing another form of sonic means for turbulence control to achieve modulation of the jet stream;

FIG. 6 shows another embodiment of the aerosol jet printer employing a fluid logic turbulence amplifier for turbulence control of the jet stream; and FIG. 7 shows a further embodiment of the aerosol jet printer employing an electric field for stabilizing the aerosol jet.

DESCRIPTION OF THE PREFERRED EMBODIMENTS

Figure 1:
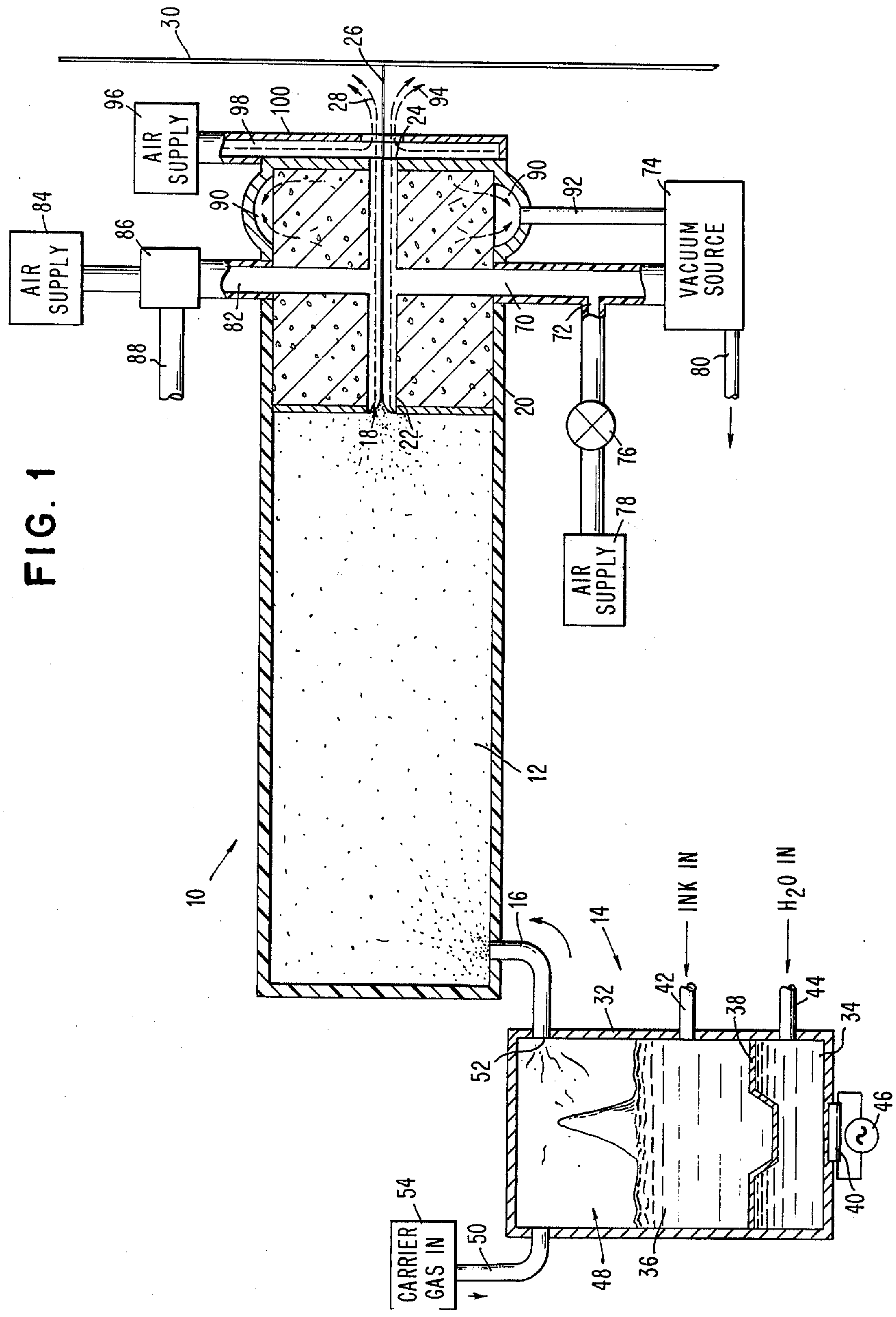
FIG. 1 is a cross-sectional view of the printing device, illustrative of the present invention.

Referring to FIG. 1 there is shown the aerosol jet printer illustrative of the present invention. The printer includes a plurality of nozzles 10 of which one is shown in cross-section in FIG. 1. Nozzle 10 includes an aerosol chamber 12 for receiving the micromist ink particles in an aerosol form from an ultrasonic nebulizer 14 via a tube 16. The aerosol is contained in chamber 12 under a low pressure, between 0.003 and 0.10 psi above atmospheric pressure. The micromist ink particles exit from the nozzle 10 via a small passageway 18 formed by a porous stainless steel block 20 providing a passage channel wall 22 extending through the steel block 20. Block 20 can be sintered steel or other porous material, such as glass. The channel 22 formed in the nozzle may be in the order of up to about 1 millimeter, i,e., 0.38 millimeter square or a 0.38 millimeter diameter circular channel extending through the steel block 20 to the exit orifice 24 where the aerosol jet exits from the nozzle. In the figure, the aerosol ink jet is indicated by the numeral 26 and is represented as a finely focused ink jet extending axially and entrained within the air or gas jet having the boundary indicated by numeral 28. The aerosol ink 26 is entrained in the jet 28 and focused to print a narrow width region on the printing medium 30, which region is substantially smaller in size than the overall jet diameter and nozzle opening.

The ultrasonic nebulizer 14 for generating the required micromist can be any suitable commercially available model, such as the DeVilbiss ultrasonic nebulzier, shown generally in FIG. 1. Although the DeVilbiss nebulizer is effective to produce micro and submicron size nebulized ink particles as required in according with the principles of the present invention, it should be understood that other forms of ultrasonic nebulization may, likewise, be as effective. Moreover, nebulizers other than the ultrasonic type may, also, be employed. For example, the Babbington nebulizer, known to those skilled in the art, has been found effective to produce micron and submicron size nebulized particles, (between 1–25 microns, preferably 2–10)

As shown in FIG. 1, the DeVilbiss nebulizer 1 comprises housing 32, the lower portion of which is filled with liquid bath 34. Where temperature control is desired, a liquid bath 34, such as a water bath, is separated from ink 36 by polymer membrane 38. Piezoelectric transducer 40 is located below the water bath 34. Ultrasonic energy from transducer 40 is coupled to ink 36 via water bath 34 and polymer membrane 38. Ink and water may be replenished at 42 and 44, respectively.

The piezoelectric transducer 40 is driven by source 46, having a frequency of the order of 1 MHz. Typically, a 1.3 MHz signal has been found effective to produce the micron and submicron size nebulized particles, required in accordance with the principles of the present invention. As is evident, the ultrasonic vibrations from transducer 40, when coupled through water bath 34 and membrane 38, act to excite or energize the ink solution 36 with sufficient vibrational intensity so as to produce nebulized ink particles of the micron and submicron order of magnitude size in the open space of ink chamber 48. A carrier gas, such as $N_2$ or air, is fed from a pressurized supply 54 into this open space via tube 50. The carrier gas acts to carry the nebulized ink mist out of the open space of ink chamber 48 via port 52. Pressurized supply 54 carries the aerosol into nozzle chamber 12 under the above mentioned pressure. As is understood by those skilled in the art, any of a variety of carrier gases may readily be employed for this purpose. Likewise, as is understood by those skilled in the art, any of a variety of commercially available inks may be employed for ink 36. Typically, any of a variety of well known inks including magnetic inks such as ferrofluids may readily be employed, such as a 200 or 400 gauss water-based ferrofluid.

The carrier gas entering inlet tube 50 acts to continuously carry the micromist of nebulized ink particles out through port 52 and through outlet tube 16 into the nozzle chamber 12 where the micromist becomes entrained within the jet 28 flowing at a high velocity through the channel 22.

When the jet of an aerosol of micron size particles of ink is impacted against paper, a line, typically much narrower than the diameter of the orifice which forms the jet, is printed. Inertial forces, both in the region near the orifice and near the point of impaction, are responsible for this sharp line definition. That is, the narrow width of the printed lines is due to two effects, free stream contraction, and inertia of the drops. Free stream contraction is a well understood effect. For an ideal orifice, the diameter of the free jet might be about 70% of the diameter of the nozzle. In practice, the actual diameter of the free jet might be about 80% of the diameter of the nozzle orifice. It is believed that the rest of the narrowing effect is caused by the inability of the drops to follow the air stream lines precisely where they curve to enter the nozzle. As will be described with respect to FIGS. 2 and 3, inertia causes the ink particles to be thrown in toward the center of the jet.

As shown in FIG. 2, the nozzle wall 60 is shown having an orifice through which the jet stream exits. The jet stream lines are indicated by numeral 62, the micromist ink particle or drop trajectory is indicated by numeral 64, the deflection away from the stream line 62 is indicated by δ, and the average stream velocity in the region of the stream line curvature is indicated by $\bar{v}_s$.

The inertial effect which causes the confinement or entrainment of the ink particles toward the center of the aerosol jet and way from the outermost air stream lines 62 is due in part to the exponential decay of relative velocity of the particles within the air stream. This is calculated by $$\text{Stokes' drag force} = F_D = 3\pi\mu D v = m\frac{dv}{dt} \text{ or } \tau = \frac{D^2\rho}{18\mu}$$

where $\tau$ = relaxation time for decay of the velocity of a spherical ink drop relative to the stream line, given by the equation above.

$D$ = drop diameter $\rho$ = drop density $\mu$ = viscosity of air (or other carrier gas)

The magnitude of the confinement or entrainment of the ink particles away from the air stream lines 62 is also due in part to the stream line curvature. To calculate δ, the deflection away from the stream line 62 of a particle of density $\rho$ and diameter D, consider a curved stream line 62 as shown in FIG. 3. Here, assume that the time of flight is much greater than $\tau$. Then, the centrifugal force is approximately equal to Stokes' drag force perpendicular to the stream line 62. Where $\theta$ = total arc of curvature of the stream line, and $\bar{v}_s$ = average stream velocity in the region of curvature which is approximately equal to the tangential velocity $v_{11}$. Then $$v_{\parallel} \quad V_s$$

$$v_{\perp} \quad \frac{\tau V_s^2}{R_s}$$

where v = perpendicular velocity. Now integrating along the stream line, the contraction, δ, of the particle trajectories from the outer stream line 62 is given by:

$$\delta = \quad v_{\perp} dt_F = \quad \frac{\tau V_s^2}{R_s} \cdot \frac{R_s d\Theta}{v_s}$$

$$\delta = \tau\,\Theta\,\bar{v}_s$$

$t_F$ is the time of flight of the particle in the region where the stream line is curved.

It is to be understood that the above formulae provide an approximate explanation of the jet entrainment phenomena occuring in the region of the orifice for purposes of simplifying the description, and therefore do not include some of the effects occuring at higher velocities.

Thus, the displacement δ of the ink particles from the stream line 62, when added to the contraction, accurately predicts the observed link line widths. Typical relationships between the inner diameter of the nozzle and the width of the jet print line are given in the Table A below:

TABLE A

| Nozzle Diameter | Print Line Width |
|---|---|
| 8 mils | 2 mils |
| 10 mils | 2–3 mils |
| 18 mils | 4–5 mils |
| 33 mils | 16–20 mils |

The above listed results were achieved with the ultrasonic nebulizer 14 producing micron sized particles in the order of 3 microns in diameter. The use of nozzles with diameters that are much larger than the lines being printed is a factor in reducing clogging problems below that otherwise associated with liquid jet systems. In one example, the above formula for calculating the displacement, δ, of the ink particles from the stream line 62 is as follows:

Where the diameter D of the ink particles produced with a 1.2 MHz nebulizer source is 2.7 microns, or $$D \text{ particle} = 2.7 \times 10^{-4} \text{ cm},$$

and the diameter D of the nozzle orifice is $$D \text{ nozzle} = 0{,}098 \text{ cm}$$

the coefficient of contraction, defined by the ratio of the area of the free jet stream at the vena contracta (the narrowest portion of the free jet) to the area of the nozzle orifice is given by $$\text{coef. of contraction} = \frac{\text{Area free jet}}{\text{Area nozzle}} = 0.64, \text{with}$$

$$D \text{ free jet} = 0.078 \text{ cm.}$$

In calculating the above coefficient of contraction, measurements of flow rates and pressure drop are used to calculate the free stream velocity and the effective area of the free jet in accordance with well known principles of fluid dynamics. For stream lines near the outer boundary of the jet the average stream velocity is approximately equal to the stream velocity at the vena contracta.

Thus, if the flow rate is 3.2 cc/sec, $$\bar{v}_s = \frac{3.2 \text{ cc/sec}}{\text{Area free jet}} = 660 \text{ cm/sec.}$$

The time constant $\tau$ is $$\tau = \frac{D^2\rho}{18\mu} = \frac{(2.7 \times 10^{-4})^2 \times 1.00 \text{ gm/cm}^3}{18 \times 1.76 \times 10^{-4} \text{ poise}} = 23 \times 10^{-6} \text{ sec}$$

where $\mu$ is given for nitrogen gas at room temperature and the liquid is assumed to have the density of water. For the outermost stream line, the angle of curvature, $\theta$, is $\pi/2$, so the deflection is $$\delta = \theta \tau \bar{v}_s = \frac{\pi}{2} (23 \times 10^{-6}) \times 660 = .024 \text{ cm.}$$

Thus the width of the aerosol region is $$W = D_{jet} - 2\delta = 0.078 - 2(0.024) = 0.030 \text{ cm.}$$

It is noted that the measured width for the above conditions was 0.033 cm.

Thus, with the appropriate ink particle size, stream velocity and arc of stream line curvature at the orifice, an ink print line can be made which is substantially narrower than the diameter of the nozzle orifice. Selection of the velocity is made such that a not-too-high velocity is used which will result in excessive overshoot of the ink particles across the axis of the jet, thereby adversely affecting line definition. These dense, well defined lines can be formed by the aerosol jet at writing speeds in excess of 15 cm/sec. An 8 nozzle head has been used to print dot matrix (5 × 8) characters at rates exceeding 50 characters per second. The chamber pressure required to create an aerosol stream velocity of 600 cm/sec is in the order of 0.004 psi.

It is noted that these results are produced without the requirement for electrical charging of the ink particles or the use of electrical or magnetic means on or near the print medium to cause wetting of the particles to the surface. Also, while other configurations of the nozzle channel might be employed, it has been found that the desired print line results are obtained by entraining the ink mist particles in the aerosol jet in accordance with the parameters set forth above. Also, it is to be noted that as used herein, the term "entrainment" is intended to mean the concentration or focusing of the micromist ink particles near the center or axis of the jet stream. In this connection it is to be pointed out that once the ink mist is entrained near the axis of the aerosol jet, a laminar jet is created whereby the printing becomes relatively insensitive to the distance between the exit of the nozzle and the print medium.

As described above, the free stream contraction and inertia of the micron size ink particles produce the narrow and dense, well defined print lines. The force and the high velocity of the ink particles against the print medium are sufficient to cause wetting by excessive impact of the ink particles to the print medium. In the same respect, if the velocity of the ink particles is reduced or such particles are diverted from the print medium, then the aerosol jet can be controlled. Referring again to FIG. 1, there is shown a fluid logic control means for controlling the aerosol jet. The fluid logic control means comprise a fluid conduit 72 connected in fluid communication with a passage 70 which is in fluid communication with the nozzle channel 22. Conduit 22 is connected to a vacuum source 74 and also connected by means of a valve 76 to a supply 78 of air pressure at between 1 and 5 psi. In operation, when the valve 76 is open, the air supply 78 counteracts the effect of the vacuum source 74 such that the aerosol jet 26 is not diverted or deflected from its axial path through the nozzle channel 22. However, when it is desired not to print, the valve 76 is closed and the vacuum source 74 acts to provide a deflection jet in the passage 70 which deflects the aerosol jet 26 out of its axial flow and down through the passage 70. A return ink line 80 is connected to the vacuum line at the source 74 such that the deflected ink can be recycled and used. The valve 76 can be a solenoid valve or other suitable fluid control device. Also, the jet channel 22 can communicate through a passage 82 with a supply 84 of clean air which is substantially under no pressure. The air supply 84 passes into the passage 82 via a chamber 86 which has a vent 88 to the atmosphere.

The porous stainless steel cylindrical nozzle portion 22 may be of a sintered form such that any micromist particles that should be deposited on the walls of the channel 22 may be drawn off by suction through the steel 20. For this purpose, a vacuum chamber 90 is provided around the steel nozzle 20 to draw off the ink particles from the channel and thereby prevent clogging of the porous stainless steel. The vacuum chamber 90 is connected to the vacuum source 74 by means of a conduit 92.

Also, there may be provided a guard flow of air, indicated by line 94, which encircles the air stream 28 at the exit portion of the nozzle. The guard flow 94 is provided by an air supply 96 connected via conduit means to a guard flow chamber 98 formed around the area of the nozzle orifice 24. The guard flow chamber 98 has a wall 100 provided with an opening that is concentric with the orifice 24 but yet is larger in diameter than such orifice opening so as to provide a guard flow 94 which encircles the aerosol jet and the stream. Also, a slot common to all nozzle orifices can be employed with a plurality of nozzle orifices. The air supply 96 provides a very low velocity flow of clean air in the outer region of the stream 28, thereby maintaining clean air around the jet in the vicinity of the nozzle orifice 24.

Referring to FIGS. 4 and 5 there are shown diagrammatic views of micromist ink printing devices in accordance with the present invention which employ turbulence control for modulating the aerosol jet. It has been found that turbulence of the aerosol jet causes mixing with the surrounding air and results in a reduction of the aerosol particle velocity in such manner that the aerosol ink particles will not wet the paper. Typically, micromist ink particles will not wet the printing medium unless the particles are propelled at some minimum velocity against such medium. The velocity of the jet of aerosol particles in the non-turbulent state is sufficient to wet the paper. However, when turbulence is introduced into the aerosol jet, the velocity of the aerosol particles is sufficiently disturbed so that wetting does not occur. In FIG. 4, an aerosol nozzle 110, similar to the nozzle 10 shown in FIG. 1, is employed with a piezoelectric transducer 112 connected at the front wall adjacent the nozzle 114. The transducer 112 introduces oscillations in the aerosol jet at the nozzle 114 such that a turbulent jet 116 results. The aerosol drop particles in the turbulent jet 116 will not wet the paper 118 under the conditions set up by the transducer 112. When the transducer 112 is not activated, then the desired laminar jet 120 results and the desired printing occurs.

Referring to FIG. 5 there is shown another embodiment for producing turbulance in the aerosol jet thereby controlling or modulating the printing. More particularly, a sonic transducer 120 is provided substantially in an axial position relative to the nozzle orifice 122 of nozzle 124. When transducer 120 is activated, a turbulent jet indicated by numeral 126 results and thereby produces a non-wetting condition whereby the partciles do not wet the paper 128. When the transducer 120 is not activated, the laminar jet 130 results. Thus, the FIGS. 4 and 5 indicate two methods whereby turbulence can be created sonically by directly or indirectly coupling the energy from piezoelectric or electromagnetic transducers to the aerosol jet. Typical modulation rates of at least 1 KHz can be employed with the devices shown in FIGS. 4 and 5.

While the above embodiments can apply to a device with a plurality of parallel jet channels, it is noted that several nozzle channels can be oriented so that their jets are focused in a non-parallel fashion toward a point, thereby bringing the printed lines closer together to each other.

Referring to FIG. 6, there is shown another embodiment of the printer wherein a fluid logic turbulence control amplifier 150 is attached to or formed as a part of the nozzle 152. Nozzle 152 contains an aerosol chamber 154 for passing the micromist ink particles as an entrained aerosol jet 156 through nozzle channel 158 in the manner described with respect to the FIGS. 1–3. Amplifier 150 comprises a porous body 160 of, for example, sintered stainless steel, having a fluid logic chamber 162 located axially around the path of the jet 156. Inlet passage 164 in the porous body 160 is connected via valve 166 to an air pressure supply 168. Downstream of the inlet passage 164 there is a diverter passage 170 which is connected to a vacuum source 172. Axial outlet channel 174 passes the laminar jet 156 in the direction of the print medium 176. A guard flow 178 is directed in front of the amplifier body 160 and is passed within a guard flow chamber wall 180, in the manner described with respect to FIG. 1. When a non-print condition is desired, the valve 166 is opened to introduce an air stream 182 into fluid logic chamber 162. Air stream 182 creates a turbulent jet 184, thereby modulating the aerosol jet 156 so that substantially no laminar jet is passed through the axial outlet channel 174. Vacuum source 172 diverts the deflected ink particles through passage 170, for recycling into the system. When the print condition is desired, the valve 166 is closed.

Referring to FIG. 7, there is shown an embodiment of the printer for controlling the stability of the micromist ink jet by means of electric fields. More specifically, an electric field voltage V is applied by a control switch 190 to the conductive front end 192 of the printer nozzle. An electrically conductive field plate 194 is mounted at a downstream location from the nozzle orifice 196 and contains a small opening 198 through which the jet 200 passes. The field plate 194 is electrically grounded. When the control switch 190 is closed, the nozzle front end 192 is at the voltage potential $V$ and an electric field exists between the field plate 194 and the nozzle front end 192. When the jet is directed through the small opening 198 in the field plate 194, the application of the bias between the field plate and the nozzle results in an improvement in the stability of the jet. Such improvement in stability allows wetting of the print medium 202 at greater distances from the nozzle and, thus, can be used for control of printing.

While this invention has been particularly shown and described with reference to the preferred embodiments thereof, it should be understood by those skilled in the art that various changes in form and details may be made therein without departing from the spirit and scope of the invention.

What is claimed is:

1. A micromist ink printing device comprising:

nozzle means having an aerosol chamber with an output port, said output port having an opening size in the order of up to about one millimeter;

nebulizer means for introducing a micromist of ink particles having a size of about 1 to 25 microns into said chamber;

pressure means for forcing said micromist of ink particles out through said output port in the form of an aerosol jet with a velocity that causes the micromist ink particles to be entrained in and focused around the axis of said aerosol jet and thereby print on a print medium a narrow width region which is substantially narrower in size than the opening size of said output port; and particle velocity control means mounted on or forming part of an aerosol chamber wall for selectively introducing turbulence into said aerosol jet such that said aerosol particle velocity is insufficient to wet with said print medium, said particle velocity control means being activated during non-print cycles, said particle velocity control means comprising a piezoelectric transducer mounted on said aerosol chamber wall adjacent said output port, and said output port is formed by a tubular jet nozzle.

2. Device as recited in claim 1, wherein said tubular jet nozzle is mounted on said piezoelectric transducer such that activation of said transducer causes oscillations of said jet nozzle.

3. A micromist ink printing device comprising:

nozzle means having an aerosol chamber with an output port, said output port having an opening size in the order of up to about one millimeter;

nebulizer means for introducing a micromist of ink particles having a size of about 1 to 25 microns into said chamber;

pressure means for forcing said micromist of ink particles out through said output port in the form of an aerosol jet with a velocity that causes the micromist ink particles to be entrained in and focused around the axis of said aerosol jet and thereby print on a print medium a narrow width region which is substantially narrower in size than the opening size of said output port; and particle velocity control means mounted on or forming part of an aerosol chamber wall for selectively introducing turbulence into said aerosol jet such that said aerosol particle velocity is insufficient to wet with said print medium, said particle velocity control mean being activated during non-print cycles, said particle velocity control means comprising a sonic transducer mounted on a wall of said aerosol chamber substantially in an axial position relative to the nozzle, whereby activation of said sonic transducer reduces the particle velocity in said aerosol jet.

* * * * *